(12) United States Patent
Krausz et al.

(10) Patent No.: US 8,313,124 B2
(45) Date of Patent: Nov. 20, 2012

(54) PIPE JUNCTION WITH SEAL PRESSING DEVICE

(75) Inventors: Eliezer Krausz, Tel Aviv (IL); Avi Chiproot, Kfar-Saba (IL)

(73) Assignee: Eliezer Krausz Industrial Development Ltd, Tel Aviv (IL)

( * ) Notice: Subject to any disclaimer, the term of this patent is extended or adjusted under 35 U.S.C. 154(b) by 255 days.

(21) Appl. No.: 12/620,605

(22) Filed: Nov. 18, 2009

(65) Prior Publication Data

US 2011/0115217 A1    May 19, 2011

(51) Int. Cl.
*F16L 41/00*    (2006.01)
(52) U.S. Cl. ........................................ 285/197; 285/110
(58) Field of Classification Search .................. 285/110, 285/180, 197–199, 373, 133.21
See application file for complete search history.

(56) References Cited

U.S. PATENT DOCUMENTS

| 3,272,534 | A | * | 9/1966 | Smith ............................. 285/47 |
| 3,360,284 | A | * | 12/1967 | Ver Nooy ...................... 285/197 |
| 3,694,009 | A | * | 9/1972 | Phillips ......................... 285/197 |
| 3,840,255 | A | * | 10/1974 | Daghe ........................... 285/197 |
| 3,863,937 | A | * | 2/1975 | Silverman et al. ............. 277/626 |
| 3,994,514 | A | * | 11/1976 | Zimmerer et al. ............. 285/373 |
| 4,097,073 | A | * | 6/1978 | Van Houtte .................... 285/197 |
| 4,168,089 | A | * | 9/1979 | Hulslander et al. ........... 285/197 |
| 4,789,189 | A | * | 12/1988 | Robertson ..................... 285/197 |
| 5,374,087 | A | * | 12/1994 | Powers ......................... 285/197 |
| 2006/0151997 | A1 | * | 7/2006 | Sayers et al. ............. 285/133.11 |
| 2007/0210576 | A1 | * | 9/2007 | Shook et al. .................. 285/197 |

* cited by examiner

*Primary Examiner* — Aaron Dunwoody
(74) *Attorney, Agent, or Firm* — Dekel Patent Ltd.; David Klein

(57) ABSTRACT

A pipe coupling including an annular seal disposed in an annular clamp housing, an aperture being formed through a side wall of the annular seal and the annular clamp housing, and a pressing ring secured to and pressed against the annular seal and a side wall of the annular clamp housing with a mechanical fastener, so as to create a water-tight junction between the annular seal and the annular clamp housing.

9 Claims, 3 Drawing Sheets

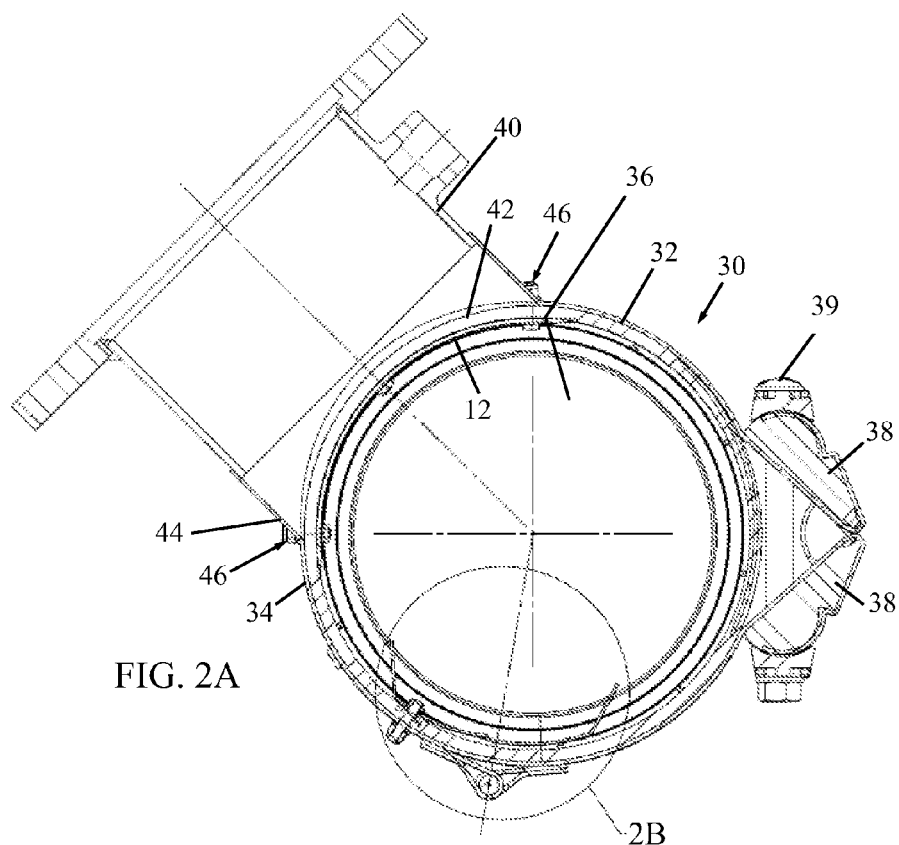
FIG. 2A
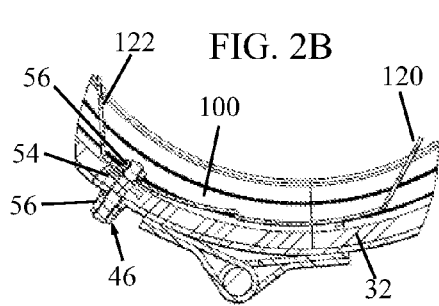
FIG. 2B
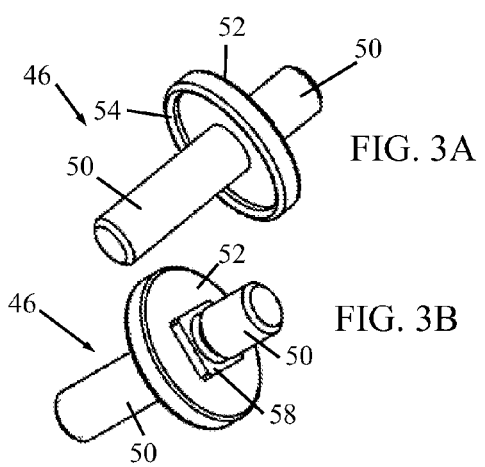
FIG. 3A
FIG. 3B

PIPE JUNCTION WITH SEAL PRESSING DEVICE

FIELD OF THE INVENTION

The present invention relates to pipe couplings and junctions, and particularly to a device for pressing against edges of a seal in a pipe junction to ensure proper sealing.

BACKGROUND OF THE INVENTION

Many kinds of removable band-type couplings for pipes exist in the art. It is noted that throughout the specification and claims, the term "pipe" encompasses any kind of generally cylindrical object.

For example, one commercially available type of pipe coupling has a seal clamp housing. Clamp members are positioned face to face and a tightening element is tightened to press an annular seal element against the outside of the pipe inserted through the seal clamp housing.

In this type of pipe coupling, the seal has integrally formed rings at opposite ends of its axial length. The pipes that are inserted in the coupling contact these rings. The inner diameter of the rings can be adjusted to accommodate different outer diameters of pipes. The seal has an axial split along its length. The edges of the seal along the split either abut each other or overlap, and are pressed against each other when the coupling is tightened on the pipes. However, the rest of the axial length of the seal between the rings is thinner than the rings and does not contact the outer diameters of the pipes inserted in the coupling. Since the pipes do not contact the seal along most of the split, a problem can possibly occur wherein the edges of the seal along the split are not adequately pressed together to form the desired fluid-tight seal.

Copending U.S. patent application Ser. No. 12/607069, filed 28 Oct. 2009, entitled "Pipe Coupling With Seal Pressing Device", to the same inventors and assigned to the same assignee of the present invention, describes a device for pressing against edges of a seal in a pipe coupling to ensure proper sealing, which solves the above-mentioned problem.

Unfortunately, there are situations which require the use of pipe junctions, such as a pipe joined to another pipe at an angle thereto (e.g., right, acute or obtuse angles). In general, repair of such piping junctions is problematic for both welded and non-welded joints, due to the difficulty of achieving proper, water-tight sealing at the junction. This is particularly difficult in the case of the above-described pipe coupling, wherein the pipes do not contact the seal along most of the split.

SUMMARY OF THE INVENTION

The present invention seeks to provide a device for pressing against edges of a seal in a pipe junction to ensure proper sealing, as is described more in detail further below.

There is provided in accordance with an embodiment of the present invention a pipe coupling including an annular seal disposed in an annular clamp housing, an aperture being formed through a side wall of the annular seal and the annular clamp housing, and a pressing ring secured to and pressed against the annular seal and a side wall of the annular clamp housing with a mechanical fastener, so as to create a water-tight junction between the annular seal and the annular clamp housing.

In accordance with an embodiment of the present invention a branch element is secured to the annular clamp housing and is not coaxial with the axial length of the annular seal.

In accordance with an embodiment of the present invention the pressing ring has an axial contour shaped as a segment of a cylinder to match the side wall of the annular clamp housing.

In accordance with an embodiment of the present invention the annular seal includes end rings at opposite ends of an axial length thereof, wherein the end rings are thicker than the axial length of the annular seal between the end rings.

In accordance with an embodiment of the present invention the mechanical fastener includes a threaded shaft with a washer flange, the washer flange having a lower rim and the threaded shaft extending from opposite sides of the washer flange, wherein when nuts are tightened on both ends of the threaded shaft, the lower rim bites into the annular seal.

In accordance with an embodiment of the present invention the mechanical fastener includes a wrench protrusion that extends from a face of the washer flange.

In accordance with an embodiment of the present invention a second seal pressing device that includes winged extensions is installed with another mechanical fastener to the annular clamp housing, the second seal pressing device pressing against axial edges of the annular seal.

BRIEF DESCRIPTION OF THE DRAWINGS

The present invention will be understood and appreciated more fully from the following detailed description, taken in conjunction with the drawings in which:

FIG. 2A is a cross-sectional view of the seal pressing device of FIGS. 1A and 1B;

FIG. 2B is a close-up of a portion of FIG. 2A;

FIGS. 3A and 3B are simplified pictorial illustrations of a mechanical fastener used to tighten the seal pressing device of FIGS. 1A and 1B, in accordance with a non-limiting embodiment of the present invention.

DETAILED DESCRIPTION OF EXEMPLARY EMBODIMENTS

Figure 1A:
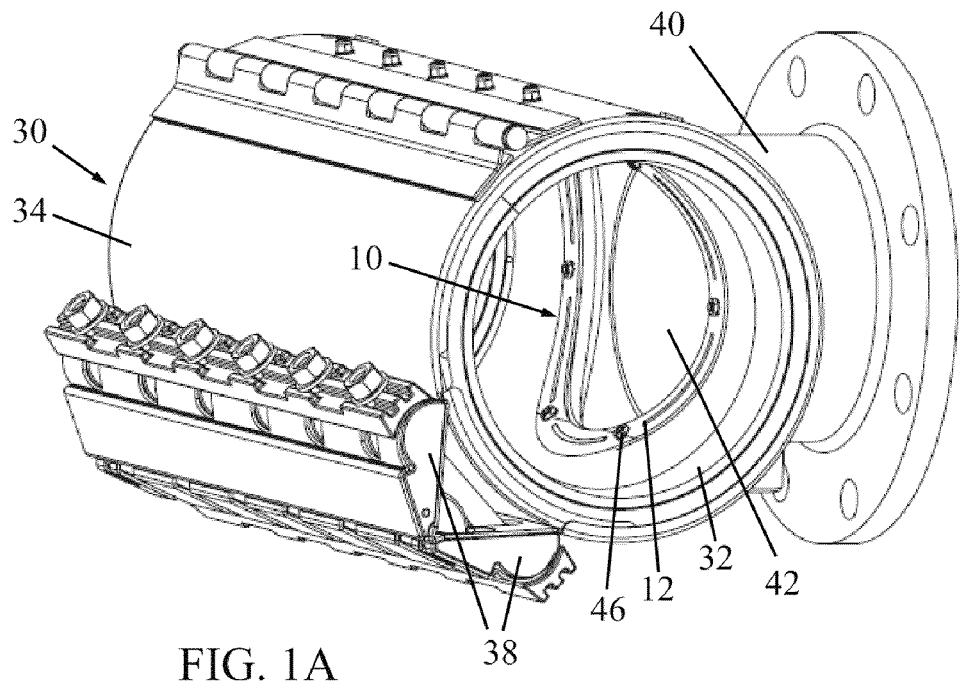
FIGS. 1A and 1B are simplified pictorial illustrations of a seal pressing device, installed at a pipe junction in a pipe coupling, constructed and operative in accordance with a non-limiting embodiment of the present invention.
Figure 1B:
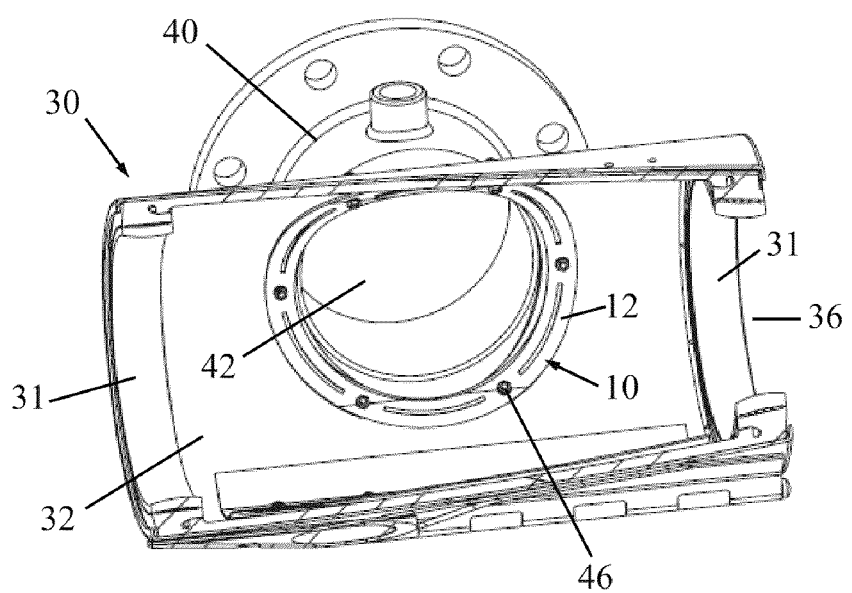

Reference is now made to FIGS. 1A and 1B, which illustrates a seal pressing device 10, constructed and operative in accordance with a non-limiting embodiment of the present invention.

The seal pressing device 10 is shown installed in a pipe coupling 30. Pipe coupling 30 includes an annular seal 32 disposed in an annular clamp housing 34. Annular clamp housing 34 has an opening 36 for inserting therein a pipe (not shown). Annular clamp housing 34 has two clamp members 38 and a tightening element 39 (e.g., one or more mechanical fasteners, such as a bolt or screw and a tightening nut, and possibly washer) that fastens and tightens clamp members 38 towards each other in a direction transverse to the axial length of annular clamp housing 34 so as to apply a radially-inward clamping force on the pipe inserted in opening 36.

Annular seal 32, which may be made of a natural or artificial elastomeric material, is radially squeezed and sealingly clamped against the outside surface of the pipe when tightening element 39, fastens and tightens clamp members 38 towards each other.

The pipe coupling may be of the type described in US Patent Application 20080012339 to the present inventors, filed on 5 Mar. 2007, or in U.S. Pat. No. 7,571,940, issued on 11 Aug. 2009 to the present inventors, the disclosures of which are incorporated herein by reference. The present invention is not limited to these pipe couplings, however.

A pipe inserted in pipe coupling 30 contacts rings 31 (FIG. 1B) at the ends of annular seal 32, but the rest of the axial length of seal 32 between the end rings 31 is thinner than the rings 31 and does not contact the outer diameters of the pipes inserted in coupling 30. Since the pipes do not contact the seal along most of the axial length, a problem can possibly occur wherein the edges of seal 32 along its length are not adequately pressed together to form the desired fluid-tight seal.

Reference is made to FIGS. 2A and 2B. The problem along the axial length is solved by installing a seal pressing device 100, described in U.S. patent application Ser. No. 12/607069, the disclosure of which is incorporated herein by reference, in pipe coupling 30. The inserted pipe presses against winged extensions 120 and 122 of seal pressing device 100, which in turn press against the axial edges of annular seal 32. The action of seal pressing device 100 pressing against these edges insures a fluid-tight seal along the axial length of seal 32.

Figure 4:
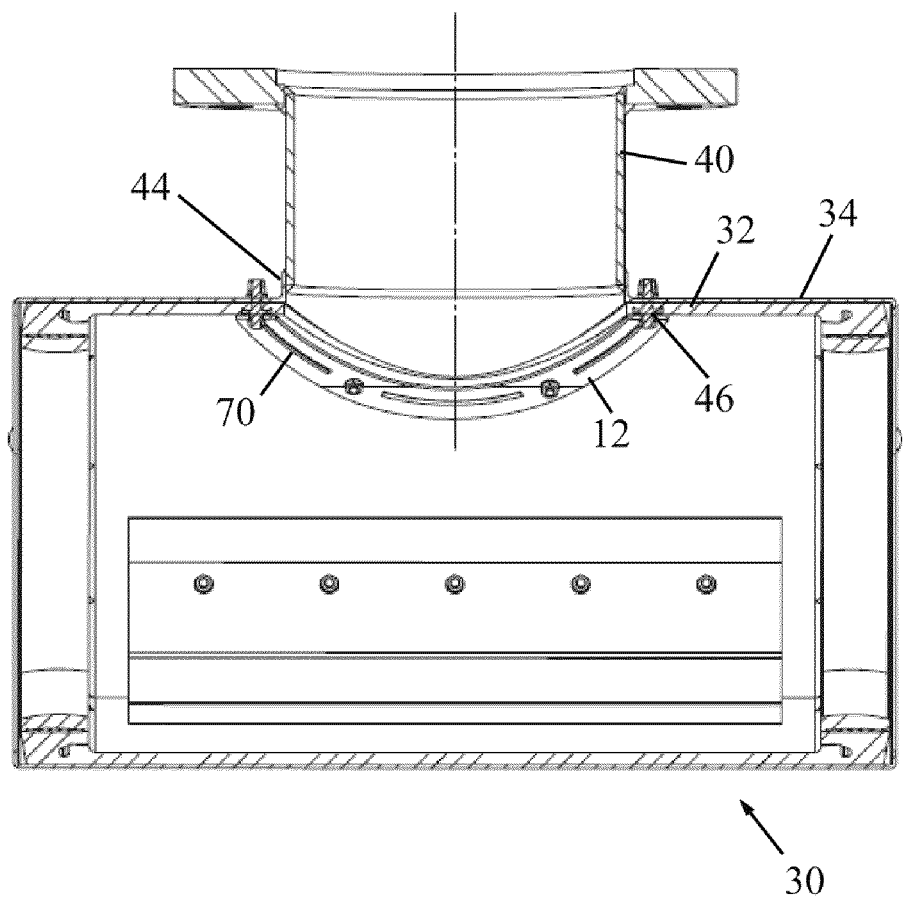
FIG. 4 is another cross-sectional view of the seal pressing device of FIGS. 1A and 1B.

Pipe coupling 30 has a branch element 44 (FIGS. 2A and 4), typically in the form of a round flange, secured to a side wall thereof (e.g., by welding or other joining method). Branch element 44 is not coaxial (e.g., it is perpendicular) with the axial length of annular seal 32. A secondary flow element 40 can be joined to branch element 44 by threaded connection, welding or any other joining method. Secondary flow element 40 can be a pipe, fluid coupling or other accessory. An aperture 42 is formed in the side wall of pipe coupling 30 at the site of the branch element 44. As can be seen in FIGS. 2A and 4, the aperture 42 is cut or formed through the full thickness of seal 32 and annular clamp housing 34. Water can leak between annular seal 32 and annular clamp housing 34. To solve this problem, the seal pressing device 10 is used to seal annular seal 32 to pipe coupling 30 in the vicinity of aperture 42, as is now explained.

Seal pressing device 10 includes a pressing ring 12 with an axial contour shaped as a segment of a cylinder to match the cylindrical wall of annular clamp housing 34 of pipe coupling 30. Pressing ring 12 may be made of steel or other suitable hard, rigid material. Pressing ring 12 is attached to seal 32 and the wall of annular clamp housing 34 of pipe coupling 30 with mechanical fasteners 46, such as bolts, screws or rivets and the like. By tightening mechanical fasteners 46, pressing ring 12 presses annular seal 32 against the wall of annular clamp housing 34 in the vicinity of aperture 42, thereby creating a water-tight seal between annular seal 32 and pipe coupling 30, that is, no water leaks between annular seal 32 and annular clamp housing 34.

Reference is now made to FIGS. 3A and 3B. In the non-limiting illustrated embodiment, mechanical fastener 46 is a threaded fastener that includes a threaded shaft 50 with a washer flange 52. Washer flange 52 has a lower rim 54. Threaded shaft 50 extends from opposite sides of washer flange 52 and both ends of threaded shaft 50 accept nuts 56 (seen in FIG. 2B). When nuts 56 are tightened on both ends of threaded shaft 50, the lower rim 54 bites into annular seal 32, thereby creating a water-tight seal at the area of the mechanical fastener 46. Mechanical fastener 46 may also be formed with a wrench protrusion 58 (e.g., four-sided protrusion) that extends from a face of washer flange 52. Wrench protrusion 58 fits into a complimentarily shaped aperture (not shown) in pipe coupling 30 or pressing ring 12 to hold mechanical fastener 46 in place during tightening thereof. Mechanical fasteners 46 may also be used to install seal pressing device 100 (FIG. 2B), by again biting into annular seal 32.

Pressing ring 12 may be formed with one or more curved depressions or dimples 70 (FIG. 4). These depressions 70 dig into annular seal 32 when pressing ring 12 is tightened against the seal, similar to the action of rim 54, thereby assuring a water-tight seal.

The scope of the present invention includes both combinations and subcombinations of the features described hereinabove as well as modifications and variations thereof which would occur to a person of skill in the art upon reading the foregoing description and which are not in the prior art.

What is claimed is:

1. A pipe coupling comprising:
an annular seal disposed in an annular clamp housing, an aperture being formed through a side wall of said annular seal and said annular clamp housing;
a pressing ring secured to and pressed against said annular seal and a side wall of said annular clamp housing with a mechanical fastener, so as to create a water-tight junction between said annular seal and said annular clamp housing, wherein said mechanical fastener passes into said pressing ring, said annular seal, and said side wall of said annular clamp housing.

2. The pipe coupling according to claim 1, further comprising a branch element secured to said annular clamp housing which is not coaxial with an axial length of said annular seal.

3. The pipe coupling according to claim 1, wherein said pressing ring has an axial contour shaped as a segment of a cylinder to match the side wall of said annular clamp housing.

4. The pipe coupling according to claim 1, wherein said pressing ring is formed with one or more curved depressions.

5. The pipe coupling according to claim 1, wherein said annular seal comprises end rings at opposite ends of an axial length thereof, wherein said end rings are thicker than the axial length of said annular seal between said end rings.

6. The pipe coupling according to claim 1, wherein said mechanical fastener comprises a threaded shaft with a washer flange, said washer flange having a lower rim and said threaded shaft extending from opposite sides of said washer flange, wherein when nuts are tightened on both ends of said threaded shaft, said lower rim bites into said annular seal.

7. The pipe coupling according to claim 6, wherein said mechanical fastener comprises a wrench protrusion that extends from a face of said washer flange.

8. The pipe coupling according to claim 1, further comprising a second seal pressing device that comprises winged extensions installed with another mechanical fastener to said annular clamp housing, said second seal pressing device pressing against axial edges of said annular seal.

9. The pipe coupling according to claim 1, wherein said annular seal is located between said pressing ring and said side wall of said annular clamp housing.

* * * * *